(12) United States Patent
Venkataraghavan (10) Patent No.: US 9,587,545 B2
(45) Date of Patent: Mar. 7, 2017

(54) FLOW AGITATOR (71) Applicant: Caterpillar Inc., Peoria, IL (US)

(72) Inventor: Jay Venkataraghavan, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 14/605,500

(22) Filed: Jan. 26, 2015

(65) Prior Publication Data

US 2016/0215672 A1 Jul. 28, 2016

(51) Int. Cl.
| | |
|---|---|
| *F01N 3/20* | (2006.01) |
| *F01N 3/28* | (2006.01) |
| *B01F 5/04* | (2006.01) |
| *B01F 5/06* | (2006.01) |
| *B01F 13/10* | (2006.01) |
| *B01F 3/04* | (2006.01) |

(52) U.S. Cl.
CPC ........ *F01N 3/2892* (2013.01); *B01F 3/04021* (2013.01); *B01F 5/0473* (2013.01); *B01F 5/0616* (2013.01); *B01F 5/0618* (2013.01); *B01F 13/1016* (2013.01); *F01N 3/2066* (2013.01); *B01F 2005/0636* (2013.01); *B01F 2005/0638* (2013.01); *B01F 2005/0639* (2013.01)

(58) Field of Classification Search
CPC ..... F01N 3/36; F01N 3/2892; B01D 53/9431; B01D 53/90; B01D 53/86; B01F 5/0268
USPC .......................................... 60/295, 317, 324
See application file for complete search history.

(56) References Cited

U.S. PATENT DOCUMENTS

| | | | |
|---|---|---|---|
| 8,615,984 B2 * | 12/2013 | Kornherr | B01D 53/90 60/286 |
| 8,635,858 B2 | 1/2014 | Levin et al. | |
| 2007/0101703 A1 * | 5/2007 | Kanaya | B01D 53/9431 60/286 |
| 2010/0005791 A1 * | 1/2010 | Ranganathan | F01N 3/36 60/310 |
| 2011/0162353 A1 * | 7/2011 | Vanvolsem | B01D 53/90 60/299 |
| 2011/0247316 A1 | 10/2011 | Dubkov et al. | |
| 2012/0144812 A1 | 6/2012 | Hyun | |
| 2013/0239546 A1 * | 9/2013 | Levin | B01F 5/0268 60/274 |
| 2014/0230411 A1 | 8/2014 | De Rudder et al. | |
| 2014/0260202 A1 | 9/2014 | Bays et al. | |
| 2014/0286832 A1 | 9/2014 | Yi et al. | |
| 2015/0040547 A1 * | 2/2015 | Brockman | F01N 3/2892 60/324 |

* cited by examiner

*Primary Examiner* — Nicholas J Weiss
*Assistant Examiner* — Dapinder Singh
(74) *Attorney, Agent, or Firm* — Leydig, Voit & Mayer, Ltd.

(57) ABSTRACT

A fluid delivery system includes a flow agitator connected to a gas conduit and disposed within an internal cavity of the conduit at an upstream location with respect to a fluid injector. The flow agitator operates to separate the gas flow passing through the conduit during operation into a bypass flow, a control flow, and a main flow, such that a recombination of the bypass flow, the control flow, and the main flow downstream of the flow agitator creates an oscillation in the gas flow that also encompasses the fluid delivered into the internal cavity by the injector.

18 Claims, 6 Drawing Sheets

FLOW AGITATOR

TECHNICAL FIELD

This disclosure relates generally to diesel exhaust fluid delivery systems used in association with engine emission control systems and, more particularly, to a device and method for enhancing urea dosing rates.

BACKGROUND

One known method for abating certain diesel engine exhaust constituents is by use of an exhaust after-treatment system that utilizes Selective Catalytic Reduction (SCR) of nitrogen oxides. In a typical SCR system, diesel exhaust fluid (DEF), which may include urea or a urea-based water solution, is mixed with exhaust gas before being provided to an appropriate catalyst. In some applications, the DEF is injected directly into an exhaust passage through a specialized injector device. In the case of urea, the injected DEF mixes with exhaust gas and breaks down to provide ammonia ($NH_3$) in the exhaust stream. The ammonia then reacts with nitrogen oxides ($NO_x$) in the exhaust at a catalyst to provide nitrogen gas ($N_2$) and water ($H_2O$).

As can be appreciated, SCR systems require the presence of some form of DEF sufficiently close to the engine system such that the engine can be continuously supplied during operation. Various DEF delivery systems are known and used in engine applications. In known DEF injection systems, a reservoir is installed onto a vehicle for containing the DEF, which is drawn from the reservoir and delivered in metered amounts to the engine exhaust system. The reservoir has a finite urea capacity such that periodic replenishment of the DEF within the reservoir is required.

In certain engine applications where prolonged operation at steady or quasi-steady exhaust flow conditions is present, for example, in engines operating generators, stationary applications, locomotives, hybrid drive vehicles and the like, urea deposits and deposit growth rates in certain regions of urea mixers tend to concentrate in particular, limited areas of the mixer. Such deposits limit the ability to dose urea that is free of deposits at higher rates, essentially limiting the urea delivery capability of the system.

SUMMARY

The disclosure describes, in one aspect, a fluid delivery system for a conduit. The conduit includes a gas inlet, a gas outlet, and an internal cavity. In the conduit, a flow direction is defined for a gas flow entering the conduit through the gas inlet and exiting the conduit through the gas outlet. The fluid delivery system further includes a fluid reservoir adapted to enclose a fluid therewithin, a fluid pump fluidly connected to the fluid reservoir via a supply conduit and disposed to draw the fluid from within the fluid reservoir, and a fluid injector associated with the fluid pump and arranged to receive a pressurized fluid form the fluid pump. The fluid injector is connected to an outer wall of the conduit and configured for delivery of fluid into the internal cavity of the conduit. A flow agitator is connected to the conduit and disposed within the internal cavity at an upstream location with respect to the fluid injector. The flow agitator operates to separate the gas flow during operation into a bypass flow, a control flow, and a main flow, such that a recombination of the bypass flow, the control flow, and the main flow downstream of the flow agitator, during operation, creates an oscillation in the gas flow that also encompasses the fluid delivered into the internal cavity by the injector.

In another aspect, the disclosure describes a method for increasing a footprint of a urea deposition area onto a urea evaporator and mixer device disposed within an exhaust gas conduit associated with an internal combustion engine. The engine may operate at a steady state, or a quasi-steady state, operating condition. The method includes placing a urea injector in the exhaust conduit at a location upstream from the urea evaporator and mixer device relative to a direction of exhaust gas flow through the exhaust gas conduit, and placing a flow agitator upstream of the urea injector in the exhaust gas conduit. The exhaust gas flow is separated into three portions including a bypass flow, a control flow and a main flow as the exhaust gas flow passes through and around the flow agitator. The method further includes entraining an injected urea flow into the separated exhaust gas flow, and inducing an oscillation in the exhaust gas flow as the bypass flow, the control flow, the main flow and the injected are recombined such that deposition region of the injected urea onto the evaporator and mixer device changes with respect to space and time.

In yet another aspect, the disclosure describes a urea distribution system for an internal combustion engine. The urea distribution system includes a fluid reservoir adapted to enclose diesel exhaust fluid (DEF) therewithin, the DEF being an aqueous solution containing urea, a DEF pump fluidly connected to the fluid reservoir via a supply conduit and disposed to draw the DEF from within the fluid reservoir, and a DEF injector associated with the fluid pump and arranged to receive pressurized DEF form the DEF pump. The DEF injector is connected to an outer wall of the conduit and configured for delivery of DEF into the internal cavity of the conduit. A flow agitator is connected to the conduit and disposed within the internal cavity at an upstream location with respect to the DEF injector. The flow agitator operates to separate and exhaust gas flow passing through the conduit during operation into a bypass flow, a control flow, and a main flow, such that a recombination of the bypass flow, the control flow, and the main flow downstream of the flow agitator, during operation, creates an oscillation in the exhaust gas flow that also encompasses the DEF delivered into the internal cavity by the injector. The oscillation changes a deposition area of the DEF onto a DEF evaporation and mixing structure disposed within the conduit for steady state and quasi-steady state operating conditions of the internal combustion engine.

In a further aspect, the disclosure describes a urea distribution system for an internal combustion engine. The urea distribution system includes a fluid reservoir adapted to enclose diesel exhaust fluid (DEF) therewithin, which is an aqueous solution containing urea. A DEF pump is fluidly connected to the fluid reservoir via a supply conduit and disposed to draw the DEF from within the fluid reservoir. A DEF injector is associated with a fluid pump and arranged to receive pressurized DEF form the DEF pump. The DEF injector is connected to an outer wall of a conduit and configured for delivery of DEF into an internal cavity of the conduit. A mixer is disposed within the internal cavity of the conduit. The mixer includes a tray evaporator and a stepped evaporator, wherein the tray evaporator forms a channel having a U-shape by intersecting three flat panels at an obtuse angle, and wherein the stepped evaporator includes a plurality of plates disposed generally parallel and at an offset distance with respect to one another, each plate forming a central, generally flat body that is flanked on either end by a wing, each wing being slanted at an angle with respect to the body.

DETAILED DESCRIPTION

This disclosure relates to emission control systems for machines and, more particularly, to DEF distribution systems for use with SCR-based after-treatment systems for diesel engines used on stationary or mobile machines. The machines contemplated in the present disclosure can be used in a variety of applications and environments. For example, any machine that performs some type of operation associated with an industry such as mining, construction, farming, transportation, marine or any other industry known in the art is contemplated. For example, the type of machine contemplated herein may be an earth-moving machine, such as a wheel loader, excavator, dump truck, backhoe, material handler, locomotive, paver or the like. Apart from mobile machines, the machine contemplated may be a stationary or portable machine such as a generator set, an engine driving a gas compressor or pump, and the like. Moreover, the machine may include or be associated with work implements such as those utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
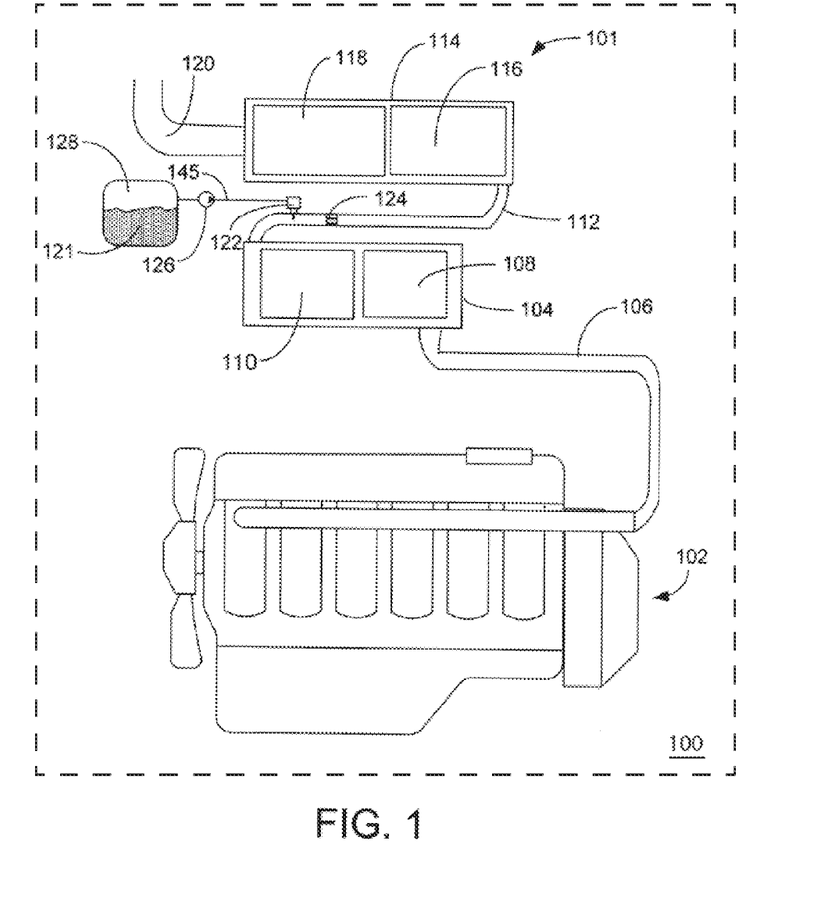
FIG. 1 is a block diagram of an engine having a SCR system in accordance with the disclosure.

FIG. 1 is a block diagram of an exhaust after-treatment system 101 associated with an engine 102 of a machine 100. The system 101 may be modularly packaged as shown in the illustrated embodiment for retrofit onto existing engines or, alternatively, for installation on new engines. In the illustrated embodiment, the system 101 includes a first module 104 that is fluidly connected to an exhaust conduit 106 of the engine 102. During engine operation, the first module 104 is arranged to internally receive engine exhaust gas from the exhaust conduit 106. The first module 104 may contain various exhaust gas treatment devices such as a diesel oxidation catalyst (DOC) 108 and a diesel particulate filter (DPF) 110, but other devices may be used. The first module 104 and the components found therein are optional and may be omitted for various engine applications in which the exhaust-treatment function provided by the first module 104 is not required. In the illustrated embodiment, exhaust gas provided to the first module 104 by the engine 102 may first pass through the DOC 108 and then through the DPF 110 before entering a transfer conduit 112.

The transfer conduit 112 fluidly interconnects the first module 104 with a second module 114 such that exhaust gas from the engine 102 may pass through the first and second modules 104 and 114 in series before being released at a stack 120 that is connected to the second module. In the illustrated embodiment, the second module 114 encloses a SCR catalyst 116 and an Ammonia Oxidation Catalyst (AMOX) 118. The SCR catalyst 116 and AMOX 118 operate to treat exhaust gas from the engine 102 in the presence of ammonia, which is provided after degradation of a urea-containing solution injected into the exhaust gas in the transfer conduit 112.

Figure 2:
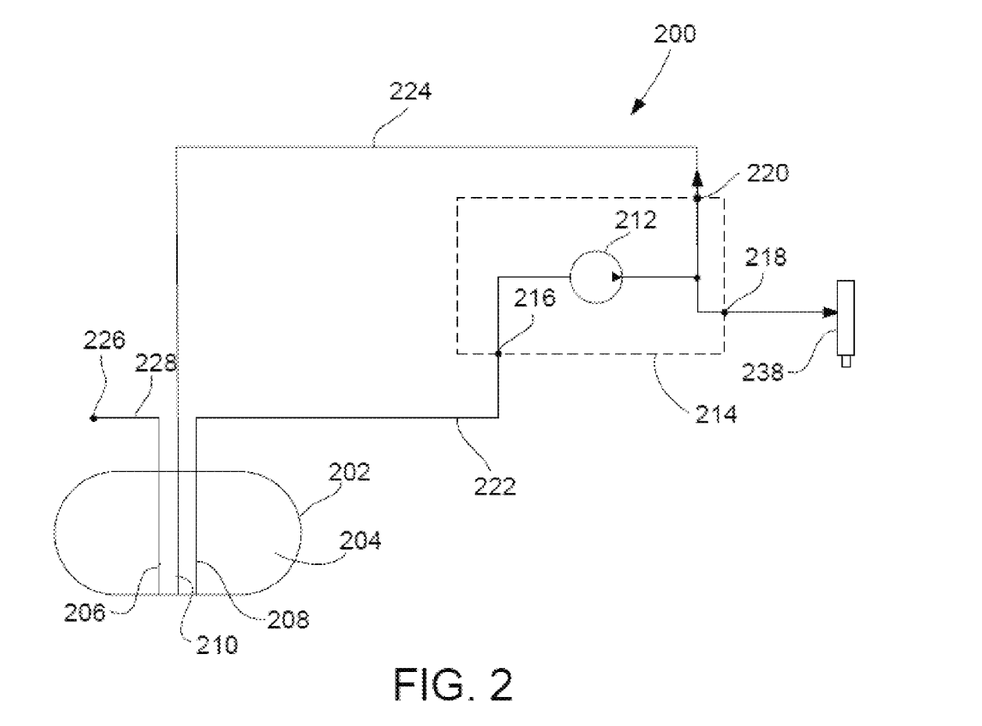
FIG. 2 is a block diagram for a fluid delivery system in accordance with the disclosure.

A block diagram showing additional details relative to a fluid delivery system 200 for the urea-containing solution in accordance with the disclosure is shown in FIG. 2. The fluid delivery system 200 may be a system for storing and delivering DEF in a vehicle and includes various filtration stages that can effectively remove debris, ice and other particles from the system. The fluid delivery system 200 in the illustrated, exemplary embodiment includes a reservoir 202 that is closed or vent-less during operation. The reservoir 202 forms an internal cavity 204 for enclosing a urea-containing water solution, which is commonly referred to as diesel exhaust fluid (DEF). Three fluid conduits or passages communicate with the internal cavity 204 to facilitate the circulation and delivery of DEF through the system. The illustrated passages include an inlet conduit 206 for filling the reservoir, an outlet or supply conduit 208 for evacuating or drawing fluid from the reservoir, and a return conduit 210 for returning unused fluid to the reservoir.

The system further includes a pump 212 mounted within a pump housing 214 that forms an inlet opening 216, an outlet opening 218 and a return opening 220. The pump 212 may be the pump 126 (FIG. 1). In the illustrated embodiment, the pump inlet opening 216 is connected to the supply conduit 208 via a supply passage 222. Similarly, the return opening 220 is connected to the return conduit 210 via a return passage 224. During operation, the pump 212 may draw working fluid from the reservoir 202, which may be metered and/or pressurized and provided to the outlet opening 218 for delivery to one or more injectors 238, which is/are disposed in fluid access to the exhaust gas of an engine, for example, the DEF injector 122 (FIG. 1). In the illustrated embodiment, the pump 212 is configured as a dosing pump such that only a metered amount is delivered to the injector(s) 238. Any fluid drawn from the reservoir that remains unused is returned to the reservoir via the return passage 224. To replenish the fluid in the reservoir, fluid may be periodically added to the reservoir from a fill opening 226 that is connected to the fill opening 226 via a fill passage 228. Other components such as filters, heaters, strainers and the like that may be included in the fluid delivery system 200 are not shown for simplicity.

In reference now back to FIG. 1, during operation, a predetermined, desired or commanded amount of DEF 121 may be injected into the transfer conduit 112 by a DEF injector 122 at a predetermined time and for a predetermined duration. The DEF 121 is contained within a reservoir 128 and is provided to the DEF injector 122 by a pump 126. As the DEF 121 is injected into the transfer conduit 112, it mixes with exhaust gas passing therethrough and is carried to the second module 114. To promote mixing of DEF with exhaust, a mixer 124 may be disposed along the transfer conduit 112.

Figure 3A:
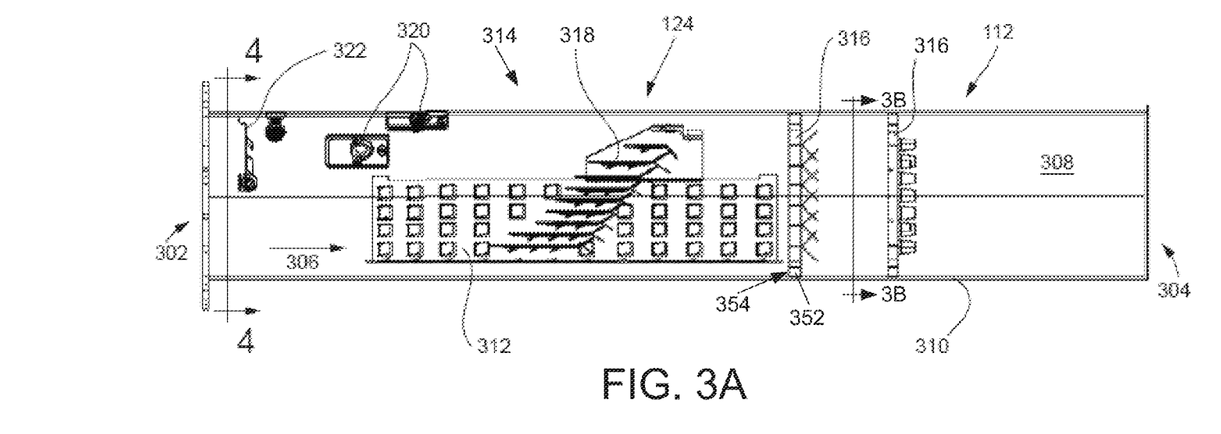
FIGS. 3A and 3B are fragmented views of a mixing tube from different perspectives in accordance with the disclosure.
Figure 3B:
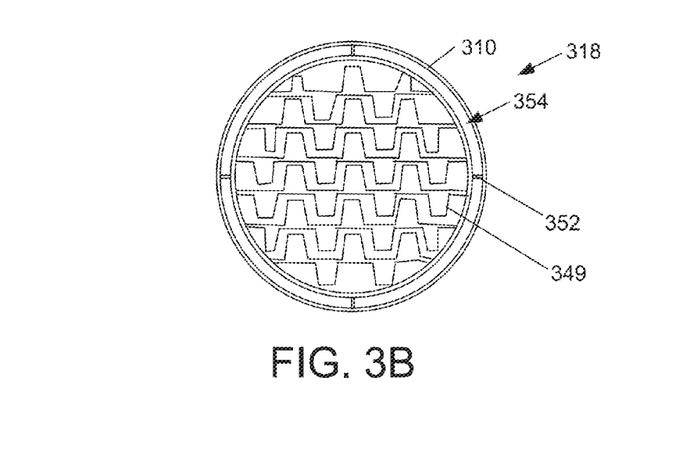
Figure 8:
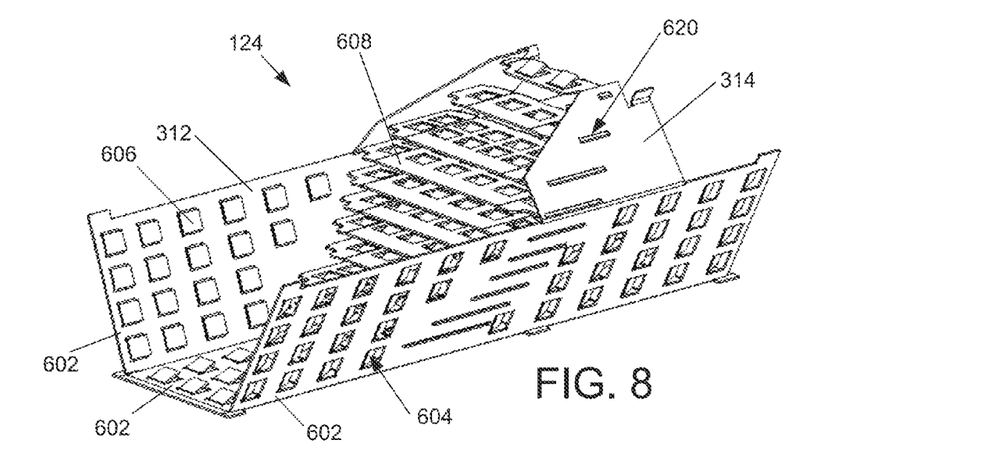
FIG. 8 is an outline view of a flow mixer and fluid evaporator structure in accordance with the disclosure.
Figure 9:
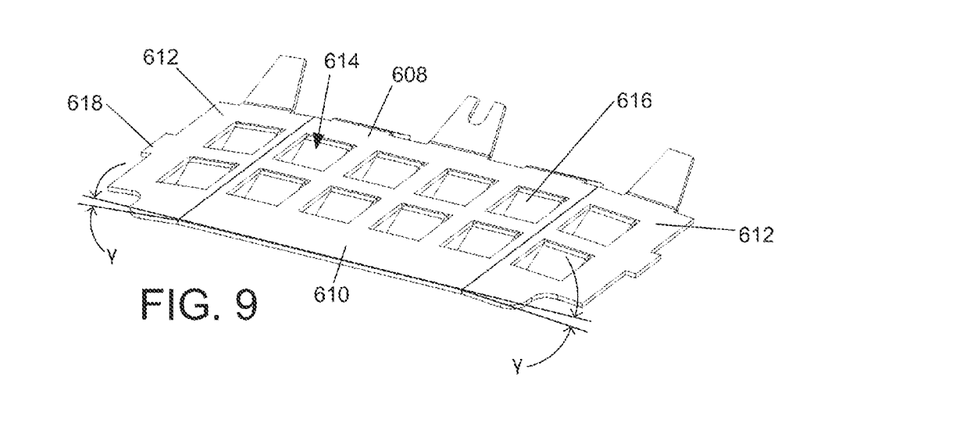
FIG. 9 is an outline view of a flow mixer and fluid evaporator fin in accordance with the disclosure.

A cross section through the transfer conduit 112 is shown in FIGS. 3A and 3B. The conduit 112, which is embodied as a straight pipe section in the illustration, includes an inlet opening 302 and an outlet opening 304 that define a flow direction 306 through an inner cavity 308 of the pipe. The inner cavity 308, which is surrounded by a cylindrical pipe wall 310, encloses the mixer 124, which in the illustrated embodiment comprises various structures including a tray evaporator 312, a stepped evaporator 314, and two finned mixers 316. The stepped evaporator 314 includes a plurality of plates 318 arranged in a stepped configuration along a flow cross section of the conduit 112, as is also shown in FIGS. 8 and 9. The mixers 124 and 316 cooperate in evaporating liquid DEF provided in the conduit 112 and in mixing the evaporated DEF with the surrounding air to form a generally homogeneous mixture that is provided to downstream components such as the SCR catalyst 116. Each finned mixer 316 includes an inner structure 349 having a generally circular shape and forming a series of fins, which contact the flow through the conduit 112. Tabs 352 mount the inner structure 349 concentrically within the wall 310 such that a gap 354 is formed peripherally around the inner structure along the wall 310. During operation, an additional bypass flow passes around each finned mixer 316 through the gap to keep liquid, or un-evaporated, spray droplets off the mixing wall to further discourage formation of deposits on the mixers. It should be appreciated that fewer, more, the same or different mixing and/or evaporation elements may be used in the conduit 112. In the illustrated embodiment, the DEF is provided to the inner cavity 308 of the conduit 112 through three DEF injectors (not shown), each of which is connected to the cylindrical pipe wall 310 at a corresponding, injector mounting boss 320 (two mounting locations shown).

A flow agitator 322 is disposed within the inner cavity 308 at a location upstream of the injector mounting boss 320 and the mixer 124. The flow agitator 322, which is also illustrated from various perspectives in FIGS. 4-6, is connected to the cylindrical pipe wall 310 by three mounting tabs 324, for example, by use of welds, an adhesive, or other fastening methods and/or structures.

In the illustrated embodiment, the flow agitator 322 includes a body plate 326 that is formed by four panels 328. The body plate 326 is flat and disposed perpendicular relative to a longitudinal centerline of the conduit 112. Each panel 328 is generally shaped as an isosceles trapezoid having a long base 330 and a short base 332 connected by two isosceles sides 334. Each pair of isosceles sides 334 is disposed at an angle, α, of about 36 degrees. In this way, four abutting panels 328 extend over a total angle of about 144 degrees with respect to a centerpoint 336, as shown in FIG. 4. In general, the body plate 326 can extend between 120 and 180 degrees with respect to the centerpoint 336. Two offsets 338 connect the body plate 326 to the two tabs 324 disposed at diametrically opposite sides of the cylindrical pipe wall 310, while the third tab 324 is connected directly between the body plate 326 and the cylindrical pipe wall 310.

Figure 5:
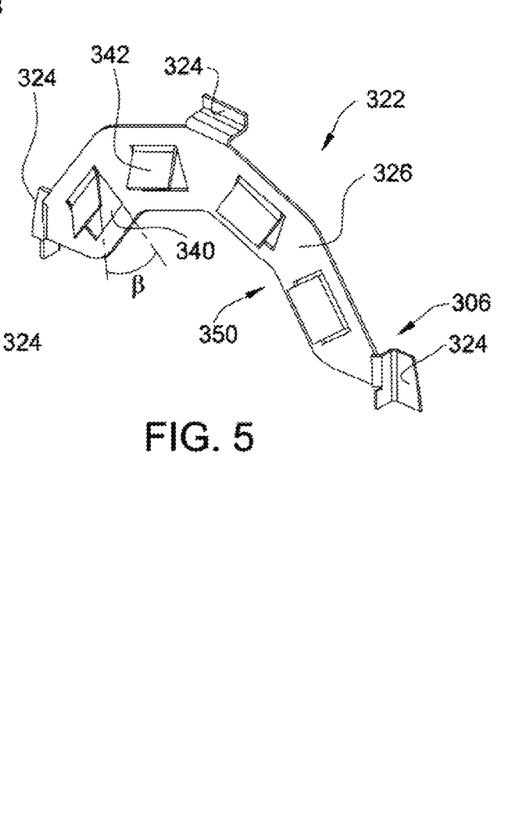
Figure 6:
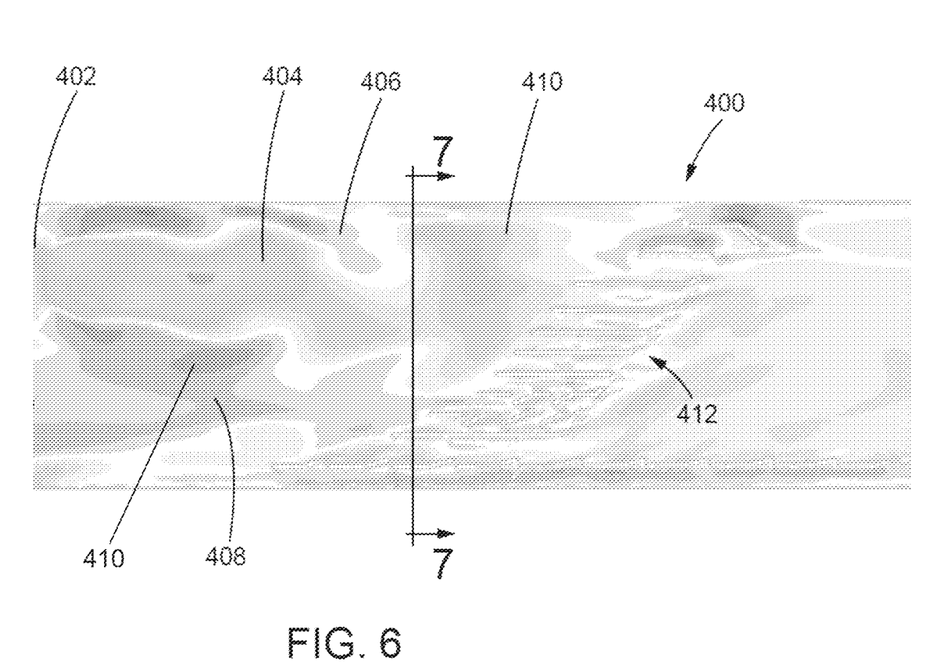
FIG. 6 is a modeled velocity plot for flow through an agitator and a mixer within a tube in accordance with the disclosure.

As is also shown in FIG. 5, each of the four panels 328 forms a rectangular window 340 that is disposed generally centrally with respect to the isosceles trapezoid. Each rectangular window 340 forms an opening in each respective panel 328 having an opening surface area that covers about ⅓ of the total surface area of the respective panel 328. A rectangular, planar flap 342 having the same shape as the respective window 340 is connected along a radially outer edge to the respective edge of the window 340 and extends at an angle, β, of about 25 degrees in a downstream direction with respect to a plane defined by the body plate 326.

Figure 4:
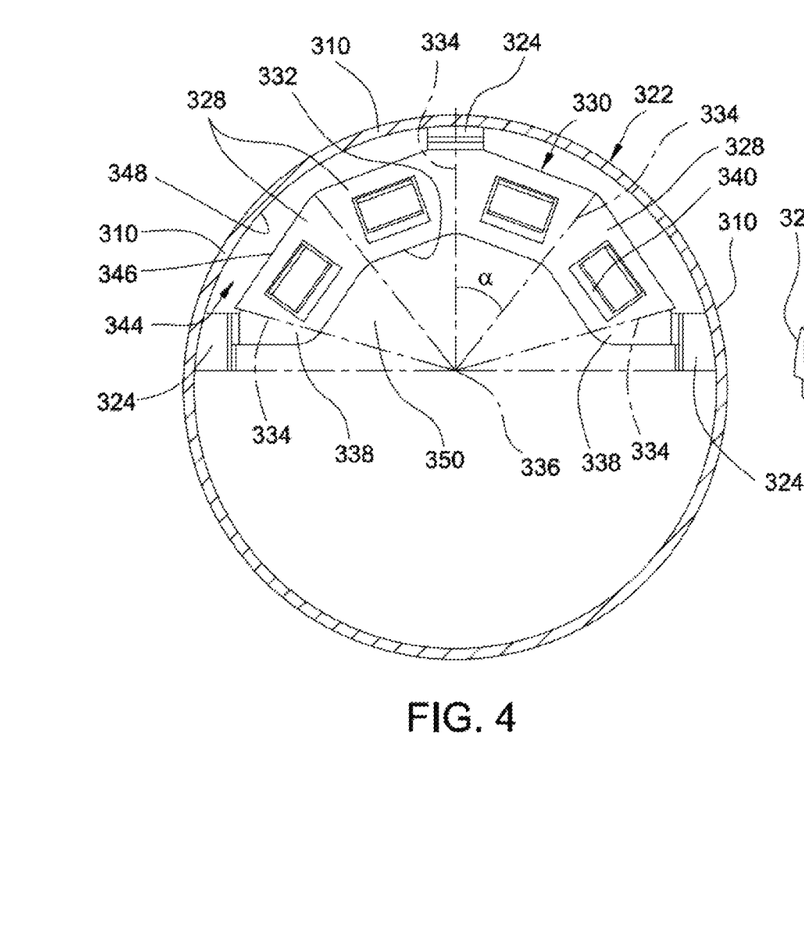
FIGS. 4 and 5 are outline views of a flow agitator, from different perspectives, in accordance with the disclosure.

When the flow agitator 322 is installed in the conduit 112 and connected to the cylindrical pipe wall 310, as shown in FIG. 4, a radially outward gap 344 is formed between a radially outward margin 346 of the body plate 326 and a radially inward surface 348 of the cylindrical pipe wall 310. The radially outward gap 344 extends between each two adjacent tabs 324. The generally segmented, annular shape of the body plate 326 also forms a central opening 350 such that, overall, three paths for air flow through and around the flow agitator 322 are formed, which include the radially outward gap 344, the windows 340, and the central opening 350.

During operation, the flow agitator 322 operates to induce an oscillation effect to an incoming fluid flow as the fluid flow, in this case, exhaust gas, passes around and through the flow agitator 322. The oscillation effect, which in a way mimics a transient gas flow, moves the fluid carrying the DEF around within the conduit 112, thus moving the impingement area of DEF on the mixing structures and also increasing the overall total impingement area of DEF onto the mixer devices disposed within the conduit 112. It is contemplated that the flow agitator 322 acts as a portal that redirects and swirls incoming fluid flow, and divides the fluid flow into three sections: a bypass flow, which is directed through the radially outward gap 344 (FIG. 4), a control flow, which is collectively directed through the opening of the window 340, and a shedding or main flow, which is made up by the remaining fluid flow that does not pass through the gap 344 and the windows 340 and instead passes through the central opening 350 and the remaining, free cross section of the conduit 112. It is noted that the bypass flow passing through the radially outward gap 344 is optional and may be omitted in an embodiment where the flow agitator 322 is connected adjacent the wall 310, i.e., taking up the gap 344, the tabs 324 are annular and extend around the body plate 326, thus covering the gap 344, and other embodiments.

In the embodiments shown, the portal or flow agitator 322 includes features such as the shape and dimensions of the body plate 326, the number and shape of the panels 328, the number, size and location of the windows 340, the size, orientation and position of the flaps 342, and other features, which features are selected and configured to set or manage a frequency and amplitude of flow oscillations induced in an incoming fluid flow within the conduit by the flow agitator 322. For this reason, the portal is placed at the inlet to the primary mixer ahead of a DEF injection point, which provides flow oscillation that breaks up and transports urea droplets as they are evaporating into different space and time than if the portal was not present. In this way, the "footprint" or deposition area of urea onto the mixing structures is increased, even during steady state or quasi-steady operating conditions, thus decreasing the concentration and deposition rate of deposits onto the mixing structures, and increasing the efficacy of urea vaporization.

INDUSTRIAL APPLICABILITY

The present disclosure is applicable to emission control systems for engines and, more particularly, to emission control systems using SCR processes requiring the injection of urea-based water solutions into engine exhaust streams. In the disclosed embodiments, a flow agitator or portal is used to induce an oscillation, swirling or turbulence in an air flow used to carry liquid urea into and through mixers and evaporators at a location upstream from an exhaust gas treatment device that uses urea vapors to reduce engine emissions.

In one embodiment, the flow agitator is used in a section of exhaust pipe at a location upstream from a urea injector and a urea evaporator and mixer arrangement of structures. A velocity profile plot of gas passing through a flow agitator disposed along a pipe segment 400 section in accordance with the disclosure, which was created using computational modeling methods, is shown in FIG. 6. As can be seen from the plot, regions of various gas velocities are present in the flow. The agitator 402 is disposed at the left side of the figure, which is the side from which gas enters the pipe segments 400. The agitator, for example, the flow agitator 322 (FIG. 3A), separates the incoming flow into three main regions, as discussed above, which include the bypass flow 406, the control flow 404, and the shedding or main flow 408. When the computational simulation is executed with respect to time, it can be noticed that vortices and a generally oscillating motion in cross section is present in a region 410 where the various flows meet at a location downstream of the agitator 402 and around a mixer/evaporator structure 412 such as the mixer 124 (FIG. 3A). As shown, the control flow 404 is a slow moving region compared to the bypass flow 406 and the main flow 408. In the illustrated embodiment, darker shaded areas of recirculation 410 can also be seen. The particular flow velocities that can be expected for the various flow portions can depend on a multitude of factors including the size and shape of the conduit, the size, shape and location of the various features of the flow agitator, and the like.

Figure 7:
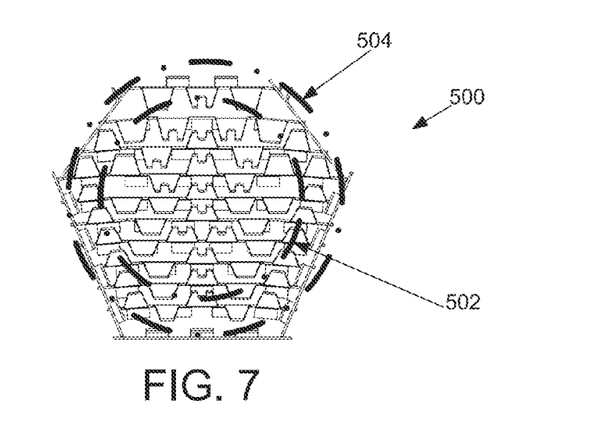
FIG. 7 is a fluid impingement location distribution on a fluid mixer in accordance with the disclosure.

To illustrate the spreading of urea that results from the oscillating nature of the air flow created by the flow agitator in accordance with the present disclosure, a urea deposition plot 500, which was created using computational modeling methods, is shown in FIG. 7. As shown in the figure, a shaped deposition area for urea is wetted at different times during operation in a larger region 504, which is has a generally circular shape denoted by a dot-dash circle and surrounds a smaller region 502, which is surrounded by a smaller circle. Each of the two areas were determined as a collection of points representing a modeled impact of urea with the underlying evaporation and mixing structure, for example, the structure 412 (FIG. 6). The points making up the smaller or central region 502 were acquired as a baseline when no agitator was used. The points making up the larger or outer region 504 (which also includes the central region 502 in surface area) were acquired under identical air flow and urea deposition rates as those used to plot the points in the central region 502, but with the addition of the agitator, whose oscillation effects on the flow spread the flow into a larger footprint that is represented by the outer region 504. According to the estimations made based on the data, the deposition surface area increase, which can be expressed as a ratio of the dark region (502+504) over the lighter region (502), represents about a 90% increase in deposition area or, stated differently, about a doubling of the deposition surface area under various operating conditions. In the computational modeling simulation, the agitator flaps were pointed in a downstream direction, and the agitator was placed upstream of the urea injectors. Similar testing indicated that the dosing capability of the system, i.e., the ability to effectively vaporize a maximum amount of urea, increased between 30% and 60% over the baseline system without the agitator.

One embodiment for the mixer 124 (FIG. 1) is shown in FIG. 8. In this view, the mixer 124 includes the tray evaporator 312 and the stepped evaporator 314 referenced in the discussion of FIG. 3. The tray evaporator 312 forms a trough or channel having a U-shape by intersecting three flat panels 602 at an obtuse angle. Each panel 602 forms a plurality of openings 604, each of which being covered by a flap 606 connected on an upstream edge of the respective opening and slanting at an acute angle towards the center of the trough.

The stepped evaporator includes a plurality of plates 608 disposed generally parallel to one another at an offset distance or gap, and in a staggered arrangement along a length of a longitudinal axis of the trough formed by the tray evaporator 312. Each plate 608 forms a central, generally flat body 610 that is flanked on either end by a wing 612. The body 610 and wings 612 form openings 614, each of which is covered by a flap 616. At each opening 614, the flap 616 is connected along a downstream edge of the opening at an acute angle towards the bottom of the trough. To provide structural rigidity to the plate 608, each wing 612 is slanted at an angle, γ, with respect to the body 610. In the illustrated embodiment, the angle γ is about 5 degrees. Each wing has a tab 618 that fits in a slot 620 in the mixer 124.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A fluid delivery system for a conduit having a gas inlet, a gas outlet, and an internal cavity, in which a flow direction is defined for a gas flow entering the conduit through the gas inlet and exiting the conduit through the gas outlet, the fluid delivery system further comprising:
   a fluid reservoir adapted to enclose a fluid therewithin;
   a fluid pump fluidly connected to the fluid reservoir via a supply conduit and disposed to draw the fluid from within the fluid reservoir;
   a fluid injector associated with the fluid pump and arranged to receive a pressurized fluid from the fluid pump, the fluid injector connected to a wall of the conduit and configured for delivery of fluid into the internal cavity of the conduit;
   a flow agitator connected to the conduit and disposed within the internal cavity at an upstream location with respect to the fluid injector, the flow agitator comprising a body plate connected to an internal surface of the wall of the conduit that encloses the internal cavity, wherein the body plate comprises two offsets disposed on diametrically opposite ends of the body plate, and wherein the body plate is connected to the wall of the conduit through three tabs, two of which interconnecting the offsets with the wall and the third being connected directly between the body plate and the wall;
wherein the flow agitator operates to separate the gas flow during operation into a bypass flow, a control flow, and a main flow, such that a recombination of the bypass flow, the control flow, and the main flow downstream of the flow agitator, during operation, creates an oscillation in the gas flow that also encompasses the fluid delivered into the internal cavity by the fluid injector.

2. The fluid delivery system of claim 1, wherein the conduit is part of an exhaust system of an engine, wherein the gas flow is an exhaust gas flow of the engine, and wherein the fluid is a diesel exhaust fluid containing urea.

3. The fluid delivery system of claim 1, further comprising an evaporation and mixing arrangement of structures disposed within the internal cavity of the conduit at a location downstream from the fluid injector.

4. The fluid delivery system of claim 1, wherein the body plate is generally shaped as a segment of an annular plate, the segment extending over an angle of between 120 and 180 degrees with respect to a conduit centerpoint.

5. The fluid delivery system of claim 1, wherein the body plate that is formed by four panels, each of the four panels being generally shaped as an isosceles trapezoid having a long base edge and a short base edge connected by two isosceles side edges.

6. The fluid delivery system of claim 5, wherein each pair of isosceles side edges is disposed at an angle, $\alpha$, of about 36 degrees.

7. The fluid delivery system of claim 6, wherein each of the four panels forms a rectangular window that is disposed generally centrally with respect to the isosceles trapezoidal shape of the corresponding panel.

8. The fluid delivery system of claim 7, wherein each rectangular window forms an opening in each respective panel having an opening surface area that covers about ⅓ of a total surface area of the respective panel.

9. The fluid delivery system of claim 8, wherein each panel further includes a rectangular, planar flap having a shape that substantially matches the respective window, wherein each respective flap is connected along a radially outer edge to the respective edge of the window.

10. The fluid delivery system of claim 9, wherein each respective flap extends at a second angle, $\beta$, relative to the body plate.

11. The fluid delivery system of claim 10, wherein the angle, $\beta$, is about of about 25 degrees in a downstream direction with respect to a plane defined by the body plate.

12. The fluid delivery system of claim 8, wherein a radially outward gap is formed between a radially outward margin of the body plate and a radially inward surface of the wall.

13. The fluid delivery system of claim 12, wherein the generally segmented, annular shape of the body plate also forms a central opening such that, during operation, the bypass flow is formed by a first portion of the gas flow passing through the radially outward gap, the control flow is formed by a second portion of the gas flow passing through the windows in the panels, and the main flow is formed, in part, by a third portion of the gas flow passing through the central opening.

14. A method of increasing a footprint of a urea deposition area onto a urea evaporator and mixer device disposed within an exhaust gas conduit associated with an internal combustion engine operating at a steady state, or a quasi-steady state, operating condition, comprising:

in the exhaust gas conduit, placing a urea injector upstream from the urea evaporator and mixer device relative to a direction of exhaust gas flow through the exhaust gas conduit;
placing a flow agitator upstream of the urea injector in the exhaust gas conduit, the flow agitator comprising a body plate having two offsets disposed on diametrically opposite ends of the body plate;
connecting the body plate to an internal surface of a wall of the exhaust gas conduit, the body plate connected to the wall of the exhaust gas conduit through three tabs, two of which interconnect the offsets with the wall and the third directly connects the body plate and the wall;
separating an exhaust gas flow into at least two portions including a control flow and a main flow as the exhaust gas flow passes through and around the flow agitator;
entraining an injected urea flow into the separated exhaust gas flow; and
inducing an oscillation in the exhaust gas flow as the control flow, the main flow and the injected urea are recombined such that deposition region of the injected urea onto an evaporator and mixer device changes with respect to space and time.

15. The method of claim 14, further comprising separating the exhaust gas flow into a bypass flow, wherein separating the exhaust gas flow into three portions is accomplished by blocking a portion of the exhaust gas flow with the body plate of the flow agitator, which forms one or more window openings and is placed at an offset distance of a wall of the exhaust gas conduit, such that the gas flow passes through a gap formed by the offset distance, the control flow passes through the one or more window openings, and the main flow passes around the flow agitator.

16. The method of claim 15, wherein the bypass flow and the main flow are accelerated with respect to the exhaust gas flow entering the exhaust gas conduit.

17. The method of claim 15, wherein the control flow is redirected by a respective flap connected to the body plate and extending at an angle with respect thereto from an edge of a respective window opening.

18. A urea distribution system for an internal combustion engine, comprising:
a fluid reservoir adapted to enclose diesel exhaust fluid (DEF) therewithin, the DEF being an aqueous solution containing urea;
a DEF pump fluidly connected to the fluid reservoir via a supply conduit and disposed to draw the DEF from within the fluid reservoir;
a DEF injector associated with a fluid pump and arranged to receive pressurized DEF from the DEF pump, the DEF injector connected to a outer wall of a conduit and configured for delivery of DEF into an internal cavity of the conduit;
a flow agitator connected to the conduit and disposed within the internal cavity at an upstream location with respect to the DEF injector, the flow agitator comprising a body plate connected to an internal surface of the wall of the conduit that encloses the internal cavity, wherein the body plate comprises two offsets disposed on diametrically opposite ends of the body plate, and wherein the body plate is connected to the wall of the conduit through three tabs, two of which interconnecting the offsets with the wall and the third being connected directly between the body plate and the wall;
wherein the flow agitator operates to separate and exhaust gas flow passing through the conduit during operation into a bypass flow, a control flow, and a main flow, such that a recombination of the bypass flow, the control flow, and the main flow downstream of the flow agitator, during operation, creates an oscillation in the exhaust gas flow that also encompasses the DEF delivered into the internal cavity by the DEF injector;

wherein the oscillation changes a deposition area of the DEF onto a DEF evaporation and mixing structure disposed within the conduit for steady state and quasi-steady state operating conditions of the internal combustion engine.

* * * * *